United States Patent [19]

Doerfling

[11] 4,150,850
[45] Apr. 24, 1979

[54] FOAM LAMINATES AND HEADLINERS
[75] Inventor: Ralph G. Doerfling, Southfield, Mich.
[73] Assignee: Detroit Gasket and Manufacturing Company, Oak Park, Mich.
[21] Appl. No.: 837,800
[22] Filed: Sep. 29, 1977

Related U.S. Application Data

[62] Division of Ser. No. 613,723, Sep. 15, 1975, Pat. No. 4,077,821.

[51] Int. Cl.² .............................. B60J 7/08; B32B 3/28
[52] U.S. Cl. ................................ 296/137 A; 156/210; 181/284; 181/288; 181/294; 428/137; 428/160; 428/91; 428/172; 428/182; 428/311; 428/315
[58] Field of Search ............... 428/182, 184, 186, 311, 428/91, 317, 320, 322, 160, 172, 137, 315; 156/210, 79; 296/137 A; 181/284, 288, 294; 264/46.4

[56] References Cited
U.S. PATENT DOCUMENTS

| 2,973,295 | 2/1961 | Rodgers, Jr. ...................... 428/160 |
| 3,042,446 | 7/1962 | Stahl ................................ 296/137 A |
| 3,068,043 | 12/1962 | Komenda ............................ 428/322 |
| 3,252,732 | 5/1966 | Squier ................................ 428/322 |
| 3,345,245 | 10/1967 | Hanusa ............................... 428/160 |
| 3,396,070 | 8/1968 | Gambill et al. ..................... 428/311 |
| 3,537,929 | 11/1970 | Keith et al. ......................... 156/79 |
| 3,544,417 | 12/1970 | Corzine .............................. 428/320 |

Primary Examiner—Marion E. McCamish
Assistant Examiner—P. Thibodeau
Attorney, Agent, or Firm—Cullen, Sloman, Cantor, Grauer, Scott & Rutherford

[57] ABSTRACT

The disclosed foam laminate preferably includes a corrugated paper sheet, a layer of thermosetting resin foam wherein the corrugations extend into and are bonded to the foam layer and a relatively flexible finish sheet bonded to the foam layer. The corrugated sheet preferably includes a corrugated paper sheet bonded to a relatively flat sheet. In the disclosed automotive headliner, the corrugations preferably extend perpendicular to the headliner side edges, providing support for the concave midportion of the headliner and preventing delamination of the paper and foam laminae.

3 Claims, 6 Drawing Figures

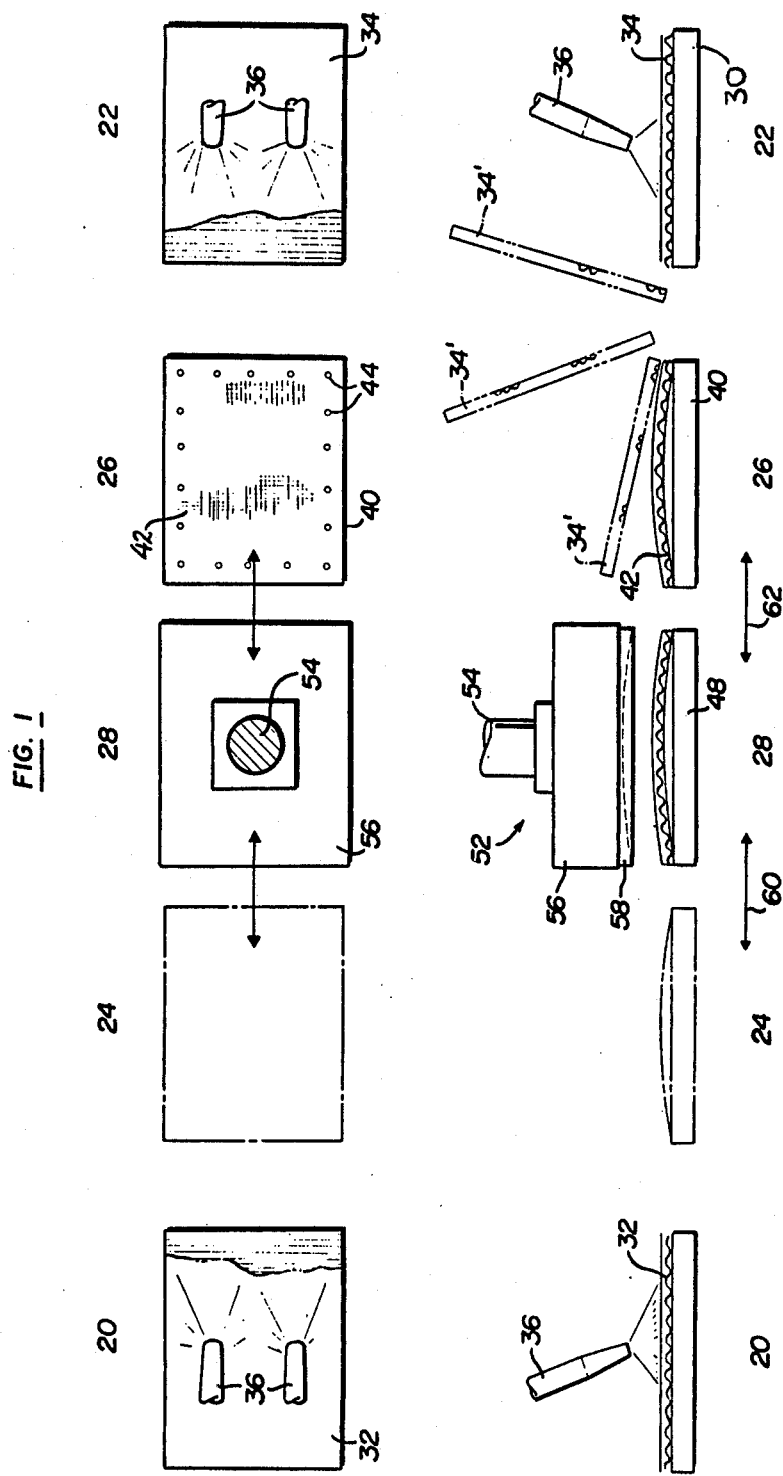

FIG. 3
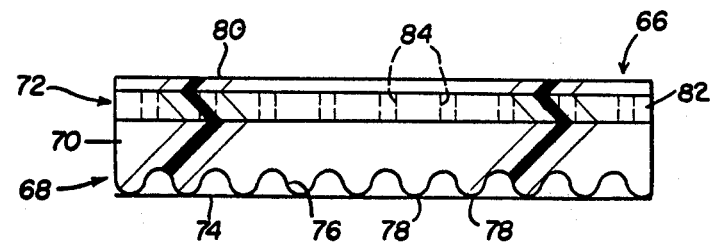
FIG. 4
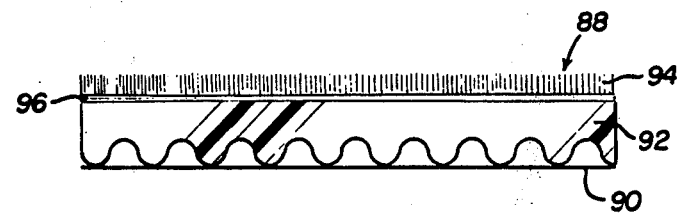
FIG. 5
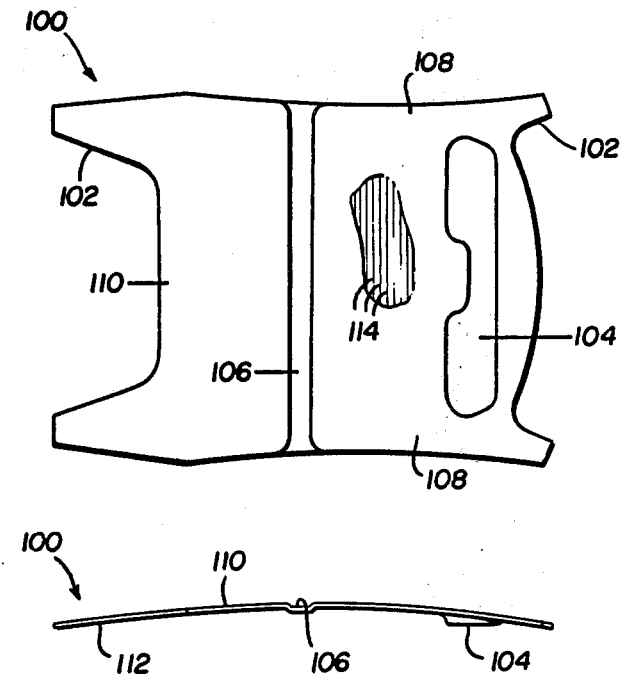
FIG. 6

FOAM LAMINATES AND HEADLINERS

RELATED APPLICATION

This application is a divisional application of my co-pending application for U.S. Pat., Ser. No. 613,723 filed Sept. 15, 1975, now U.S. Pat. No. 4,077,821.

FIELD OF THE INVENTION

The foam laminate of this invention is particularly suitable for applications requiring a relatively large, self-supporting contoured sheet or laminate, such as automotive headliners. More particularly, the method of this invention produces a self-supporting contoured foam laminate which is attractive in appearance and meets the requirements of an automotive headliner, including sound attenuation, temperature, etc.

DESCRIPTION OF THE PRIOR ART

Automotive headliners and the like must be able to withstand the extreme temperature variations encountered in the automotive interior, the headliner must provide sound attenuation and must be attractive in appearance. The headliner is supported on a ledge provided primarily at the side edges and the headliner must be sufficiently resilient to be received within the automotive interior during installation. Automotive headliners are presently made utilizing a relatively rigid substrate sheet, such as perforated fiberboard or the like, which is covered with a vinyl or foam-vinyl finish sheet. The fiberboard is generally formed into the concave shape of the interior of the automotive roof by steaming or the fiberboard may be soaked and formed in a conventional die. The finish sheet is generally bonded with adhesive to the substrate supporting sheet.

Foam-fabric laminates are presently formed by adhesive bonding a foam sheet to the fabric or casting a foam sheet upon a carrier and applying the fabric, under pressure, after foaming and prior to complete curing. Generally, an adhesive is still required. Where foam is applied in fluid form to a relatively porous fabric, such as a perforated finish sheet, the foam bleeds through the fabric during blowing. Such foam-fabric laminates are generally not self-supporting, particularly where an open cell resilient plastic foam is utilized. The need therefore remains for a method of forming a self-supporting resilient foam laminate which eliminates the requirement for casting the foam prior to application to the substrate and bonding.

Another particular problem in the prior art has been to form a contoured self-supporting laminate having a flexible finish sheet, without wrinkling the laminate. Where the foam sheet is cast and at least partially cured prior to application of the substrate and the finish sheet, wrinkles are formed in the finish and substrate sheets during forming. These problems have been solved in the method of the present invention as described hereinbelow.

SUMMARY OF THE INVENTION

The foam plastic laminate of this invention includes a formable self-supporting sheet, preferably paper, a flexible open cell foam layer, preferably polyurethane and a flexible finish sheet. In the preferred embodiment, particularly the preferred embodiment of the automotive headliner of this invention, the support sheet is a corrugated paper sheet having parallel projecting corrugations extending generally perpendicular to the side edges of the headliner which support the concave center portion of the headliner. The corrugations project into and are bonded to the foam layer, preventing delamination of the foam layer and paper sheet. The disclosed embodiment of the paper sheet includes a flat sheet and a corrugated sheet bonded to the flat paper sheet at the folds of the corrugations.

The method of this invention includes spraying an open cell, flexible plastic foam on one sheet, preferably the paper sheet, applying the finish sheet over the foam layer and forming the foam laminate in a die under pressure. The preferred method of this invention is performed in three stations. The flexible polyurethane foam is sprayed on the paper composition sheet in the first station. The flexible finish sheet is stretched over a male die member or platen in the second station and the die is the third station. The face of the support sheet, including the foam layer is then applied over the stretched finish sheet, forming the foam laminate.

The male die member including the laminate is then promptly disposed within the die opposite or beneath a complementary female die or platen. The die is then closed and the laminate is formed under heat and pressure into the desired contour.

A relatively fast creaming, open cell sprayable polyurethane foam is preferred in the method and laminate of this invention. A fast creaming foam reduces bleedthrough and avoids the hard board-like quality of rigid foams particularly formulated for application to pervious substrates. Further, slow reaction foams tend to soak into the substrate, without foaming. Further, a polyurethane foam is particularly suitable for automotive headliners which must attenuate or deaden the sound in the passenger compartment, cushion impact, preferably provide a soft-hand quality and withstand the extreme temperature variations normally encountered in such applications. In the preferred method of this invention, the laminate is formed while the foam is green or uncured and relatively wet. The foam layer is thus set with the support layer during forming. Other advantages and meritorious features of the present invention will be more fully understood from the following description of the preferred embodiments, the drawings and the appended claims.

BRIEF DESCRIPTION OF THE DRAWINGS

FIG. 1 is a top, schematic view, of the method steps of the present invention;

FIG. 2 is a side elevation of the method disclosed in FIG. 1;

FIG. 3 is a cross-sectional view of one embodiment of the foam laminate formed by the method shown in FIGS. 1 and 2;

FIG. 4 is a cross-sectional view of a second embodiment of the foam laminate formed by the method disclosed in FIGS. 1 and 2;

FIG. 5 is a top elevation of an automotive headliner which may be formed by the method disclosed in FIGS. 1 and 2; and FIG. 6 is a side elevation of the automotive headliner shown in FIG. 5.

DESCRIPTION OF THE PREFERRED EMBODIMENTS AND METHOD OF INVENTION

The method of forming a self-supporting contoured formed plastic laminate disclosed in FIGS. 1 and 2, includes three stations, permitting substantially continuous operation with one die. There are two foaming stations 20 and 22 disclosed in FIGS. 1 and 2, two stretching stations 24 and 26 and one central die stations 28. The foaming stations 20 and 22 include a support or table 30 which supports the sheet 32 and 34, respectively, which are to receive the foam layer.

As stated, the preferred foam is a flexible open cell polyurethane foam which is sprayed upon one sheet of the laminate as shown in FIGS. 1 and 2. The sheets 32 and 34 are corrugated paper sheets having projecting corrugations as shown in FIGS. 3 and 4. In the disclosed embodiment, the plastic foam is sprayed through nozzles 36 onto the corrugated paper sheets 32 and 34. As will be understood, the nozzles 36 may swing or reciprocate to evenly cover the corrugated paper sheets 32 and 34 or the tables 30 may be moved beneath the nozzles 36.

The second stretcher stations 24 and 26 include a contoured male die member or platen 40 which is convex in the disclosed embodiment. A stretchable finish sheet 42 is stretched over the convex face of the male die member 40 as shown in FIG. 1 by conventional means. In the disclosed embodiment, the sheet 42 is stretched over die pins 44. The male die member 48 is disposed in the die station 28, as discussed hereinbelow.

Immediately upon completion of spraying the corrugated surface of the paper sheets 32 and 34, the foamed side of the paper sheet is disposed over the stretched finished sheet 42, as shown in FIG. 2, at stations 22 and 26. In the disclosed embodiment of the method, the corrugated paper sheet 34 is simply reversed or flipped as shown at 34 to dispose the foamed surface of the corrugated sheet over the stretched fabric 42. It will be understood that the nozzles 36 may be swingably mounted to dispose the nozzles out of the way for receipt of the paper sheet upon the male die member 40.

A laminate is thus formed having the foam layer located between the paper and the finish sheets. Similarly, a laminate was formed at station 24 on male die platen 48. The platen is then shuttled to die station 28 in die 52. The die includes a conventional ram 54, a female die platen 56 and a concave female die 58 which is complementary to the convex die member 48. The die is then closed by extending ram 54 and the foam laminate is formed to the contoured configuration of the die members. The die member 48 is then shuttled to the left in FIGS. 1 and 2, as shown by arrow 60, to receive the die member 40 in die 52 as shown by arrows 62. The fabric is then stretched over convex die member 48, the foamed surface of paper sheet 32 is disposed over the stretched sheet and the process is repeated. It can be seen therefore, that the die station arrangement of FIGS. 1 and 2 provides a substantially continuous process of forming contoured foam laminates.

FIGS. 3 and 4 show two typical cross-sections of a foam laminate which may be formed by the methods disclosed in FIGS. 1 and 2. The foam laminate 66 disclosed in FIG. 3 includes a paper lamina 68, a foam lamina 70 and a finish lamina 72. The paper lamina in FIG. 3 includes an exterior paper sheet 74 and a corrugated paper sheet 76 bonded to the exterior sheet 74 at the corrugation folds 78. Corrugated kraft paper of the type shown is commercially available from various sources. As described, the polyurethane layer 70 is preferably relatively fast creaming open cell flexible polyurethane foam which may be sprayed as shown in FIGS. 1 and 2. The polyurethane foam is thus permanently bonded to the projecting corrugations 76, substantially increasing the bonded area and preventing delamination between the foam and the corrugated paper laminae. Further, the corrugations provide flexibility in the planes of the folds 78, but make the laminate relatively rigid perpendicular to the folds.

The finish sheet 72 in this embodiment includes a finish or cover sheet 80 and a foam backing sheet 82 which is permanently bonded to the cover sheet 80. In the disclosed embodiment, the foam sheet 82 includes a plurality of spaced perforations 84. The finish or cover sheet 80 may be a conventional vinyl or polyurethane film and the foam sheet 82 may be a conventional plastic foam, such as polyurethane, which is compatible with the foam layer 70. Suitable forms will be described more fully hereinbelow.

The embodiment of the foam laminate 88 in FIG. 4 includes a corrugated paper sheet 90, which may be identical to the corrugated paper sheet 68 of FIG. 3, a foam layer 92 and a finish sheet 94. The finish sheet in the embodiment of FIG. 4 is a conventional carpet having a backing 96 bonded to the foam layer by the method disclosed in FIGS. 1 and 2. As will be understood, a carpet is relatively porous, making it difficult to apply an integral foam layer. In the method disclosed in FIGS. 1 and 2, the foam is applied to the corrugated paper sheet 90 and the carpet finish sheet 94 is applied over the polyurethane foam layer, reducing the problem of bleed-through. Where the finish sheet is pervious, such as the carpet 94 shown or a fabric, the finish sheet is preferably heated prior to application of the paper-foam layers, reducing bleed-through and "skinning" of the foam. A foam skin layer also transmits sound and therefore heating the finish layer improves sound attenuation. For example, the finish layer may be preheated to 100° to 150° F. for improved results. It may also be possible to spray the polyurethane foam directly upon the carpet layer, using a very fast creaming polyurethane foam or by heating the carpet, prior to application of the foam, providing a blow-through barrier.

The finish sheet may also be chosen from various fabrics and plastic films including polyurethane, vinyl, etc., woven and unwoven mats and the like. The finish sheet is preferably flexible and may be stretchable as described. The foam layer is preferably a flexible open cell polyurethane foam such as described in various prior art patents, including British Pat. No. 1,306,372 of the Union Carbide Corporation, and U.S. Pat. No. 3,046,177, 3,061,475 and 3,477,890. The particular foam formulations will of course depend upon the application of the laminate. A relatively fast creaming, open cell sprayable polyurethane foam is preferred in the method and laminate of this invention. As described, a fast creaming foam reduces bleed-through and avoids the hard board-like quality of rigid foams particularly formulated for application to pervious substrates. A slow reaction foam tends to soak into the substrate, without foaming. Where the foam laminate is utilized for automotive applications, such as the headliner described hereinbelow, the laminate must attenuate the sound in the passenger compartment, cushion impact and preferably provide a soft-hand quality. Further, and most importantly, the foam must withstand extreme temperature variations. Further, in the method of this invention, the laminate is formed while the foamed layer is green or uncured and relatively wet. The foam layer is thus set with the support layer during foaming.

A relatively flexible polyurethane foam having a density of about two pounds per cubic foot has been found suitable in automotive applications. One example of a suitable flexible polyurethane foam includes an isocyanate component, comprising about 90% polymeric isocyanate and 5 to 10% inert flame retarder and a resin or polyol component comprising about 60 to 70% polyether polyol, 20 to 30% fluorocarbon 11-B (trichlorofluoromethane) and approximately 1% silicone surfactant, an organic tin catalyst and an amine catalyst in amounts less than one percent. The isocyanate and polyol components being mixed in approximately a one to one ratio. The foam is also preferably applied "hot" to the substrate to reduce bleed-through and skinning, for example about 140° F.

FIGS. 5 and 6 illustrate a typical automotive headliner 100 formed by the method of this invention. The headliner is generally concave to conform to the inerior surface of the passenger compartment roof and includes a longitudinally projecting wing 102 at each of the headliner corners which covers the supporting columns of the roof. It will be understood that the configuration of the headliner will depend upon the particular application and the configuration of the roof. The disclosed embodiment of the headliner also includes a visor well or recess 104 which receives the sun-visors and a roof center channel 106 which normally receives the automotive roof support channel. The headliner configuration shown in FIGS. 5 and 6 illustrates the fact that the headliner must be self-supporting and permanently contoured in the desired shape.

An automotive headliner is generally supported along the side edges 108 on a ledge or channel adjacent the roof in the passenger compartment, not shown. Further support may also be provided at the forward and rearward edges however, the headliner must be self-supporting between the side edges. As described above, the headline must also be sufficiently resilient to permit receipt and installation of the headliner in the passenger compartment.

The automotive headliner of this invention provides the necessary rigidity, particularly between the side edges 108. Further, the improved headliner of this invention accurately reproduces and maintains die definition, provides excellent sound attenuation, cushioning and has an excellent appearance.

The preferred embodiment of the headliner includes a corrugated paper or paper composition sheet 110, an intermediate foam layer, not shown, and a finish sheet 112, such as disclosed in regard to FIGS. 3 and 4 above. As described, the foam layer or lamina is preferably polyurethane foam able to withstand extreme temperature variations encountered in the automotive passenger compartment. The corrugations 114 of the paper sheet preferably extend transverse or generally perpendicular to the side edges 108, improving support for the headliner between the side edges, as described above. More importantly, the corrugations increase the bonding area between the paper sheet and the foam layer more than three fold, eliminating delamination between the foam and paper layers. In certain applications the corrugations may extend parallel to the side edges, particularly where the headliner is substantially longer than wide, requiring additional support between the headliner ends. The headliner of this invention is also sufficiently resilient to permit installation in the automotive passenger compartment. The headliner may be resiliently flexed to be received in the passenger compartment and in the supporting channels during installation. The contour of the headliner is also permanently formed in the laminate by the method of this invention.

It will be understood that the improvements of the method of this invention may be utilized to produce various contoured foam laminates, including but not limited to furniture coverings, such as chairs, various interior automotive components, including side and wheel coverings for station wagons and fast backs, etc. Additional layers may also be added to the foam laminate of this invention as described in regard to FIGS. 3 and 4, including various finished sheets and layers, depending upon the particular application. Further, a skrim may be utilized in certain applications, particularly where high impact strength is required. The skrim may be disposed in the foam layer or between the foam layer and the finish sheet.

I claim:

1. A self-supporting sound and energy foam laminate, comprising: a corrugated paper sheet having a plurality of generally parallel projecting corrugations bonded to a relatively flat sheet, a relatively flexible open cell thermosetting resin foam layer covering said corrugations with said corrugations projecting into and permanently bonding to said resin foam layer and a relatively soft, energy absorbing finish sheet overlying and bonded to said resin foam layer, said finish sheet having a separate self-sustained foam layer having a plurality of spaced perforations overlying and bonded to said resin foam layer and a relatively soft energy absorbing cover overlying said self-sustained foam layer said cover spaced from said paper corrugations by said foam layer and said separate foam layer, said finish sheet forming a laminate with the resin foam layer located between and bonded to said finish and corrugated sheet with a space between said corrugated and flat sheets being open to absorb sound.

2. An automotive headliner having opposed side edges along its length supporting the concave mid-portion located between said side edges, the headliner having a greater length than width, comprising a corrugated paper substrate sheet having generally parallel projecting corrugations extending generally perpendicular to said headliner side edges providing rigidity between said side edges, a relatively flexible open cell thermosetting resin foam layer bonded to the corrugated face of said paper sheet with said corrugations projecting into and bonded to said foam layer and a flexible finish sheet overlying said foam layer, on the convex side of said headliner, said finish sheet comprising a relatively soft energy absorbing portion and a separate self-sustained, pervious layer wherein said relatively soft energy absorbing portion is spaced from said corrugations by said resin foam layer and by said self-sustained, pervious layer, said finish sheet forming a laminate with the foam layer located between and bonded to said sheet and said corrugations adding rigidity to said laminate and increasing the bonded area between the paper sheet and said foam layer, eliminating delamination.

3. The foam laminate defined in claim 2 characterized in that said finish sheet is a carpet having a projecting nap.

* * * * *